United States Patent
Pai

(10) Patent No.: US 7,702,782 B1
(45) Date of Patent: Apr. 20, 2010

(54) USING WATERMARKS TO INDICATE ALERTS IN A STORAGE AREA NETWORK MANAGEMENT CONSOLE

(75) Inventor: Pramod Kulyadi Pai, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 597 days.

(21) Appl. No.: 11/582,610

(22) Filed: Oct. 18, 2006

(51) Int. Cl.
  *G06F 15/173* (2006.01)
(52) U.S. Cl. .................. 709/224; 709/223; 709/225; 715/272; 715/790
(58) Field of Classification Search ............ 709/223, 709/224, 225; 715/272, 763, 764, 765, 768, 715/778, 788, 790
  See application file for complete search history.

(56) References Cited

U.S. PATENT DOCUMENTS

| 6,661,438 | B1* | 12/2003 | Shiraishi et al. ............ 715/835 |
| 6,771,795 | B1* | 8/2004 | Isnardi ....................... 382/100 |
| 6,981,035 | B1* | 12/2005 | Goldberg et al. ............ 709/223 |
| 7,194,538 | B1* | 3/2007 | Rabe et al. .................. 709/224 |
| 7,287,063 | B2* | 10/2007 | Baldwin et al. ............. 709/216 |
| 2001/0030664 | A1* | 10/2001 | Shulman et al. ............ 345/835 |
| 2003/0135593 | A1* | 7/2003 | Lee et al. .................... 709/223 |
| 2004/0078750 | A1* | 4/2004 | Frank .......................... 715/500 |
| 2004/0098383 | A1* | 5/2004 | Tabellion et al. ............. 707/3 |
| 2006/0072785 | A1* | 4/2006 | Davidson et al. ............ 382/100 |
| 2006/0168450 | A1* | 7/2006 | Yagawa ....................... 713/176 |

OTHER PUBLICATIONS

Computer Reseller News, Marc Spiwak, "Procuro's PIMM Keeps Track of All Managed Services", Jun. 14, 2004.*
Web.archive.org, "PIMM Enterprise Management Service", Feb. 20, 2004.*

* cited by examiner

*Primary Examiner*—Ario Etienne
*Assistant Examiner*—Barbara N Burgess
(74) *Attorney, Agent, or Firm*—Chapin IP Law, LLC

(57) ABSTRACT

Methods and systems for using watermarks to indicate alerts in a storage area network management console are disclosed. An alert provides notification of the occurrence of an event in a storage area network. An event associated with a component of the storage area network is detected. An alert level corresponding to the detected event is determined. A watermark is placed on the graphical user interface to indicate an alert. An initial characteristic of the watermark depends on the determined alert level, and the watermark is oriented to be visible at a distance from the graphical user interface. Multiple alerts may be indicated through changes in a characteristic of the watermark or by changing a watermark initially placed on the graphical user interface upon initiation of the graphical user interface.

24 Claims, 5 Drawing Sheets

USING WATERMARKS TO INDICATE ALERTS IN A STORAGE AREA NETWORK MANAGEMENT CONSOLE

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a user) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Certain console applications include Graphical User Interface (GUI) software programs that enable network managers to graphically manage, control and configure various types of hardware and software resources or managed entities associated with a corresponding managed network. In one conventional storage area network management application, rendering the graphical user interface enables the network manager to graphically select, interact with, and manage local or remote devices and associated software processes operating in the network. More specifically, based on use of the graphical user interface in combination with an input device such as a hand operated keyboard and/or mouse and corresponding pointer displayed on a viewing screen, a network manager is able to manage hardware and software entities such as storage devices, peripherals, network data communications devices, and so forth associated with the network. Typically, in such network management applications, a network manager may select a displayed icon representing a corresponding resource in the storage area network and apply a management command in order to display corresponding management information.

Enterprise Storage Networks are large and complex environments that include various elements such as storage arrays, switches, hosts and databases all inter-networked. These elements occur in several hundreds in such environments. These elements in turn may consist of several hundred thousands of manageable elements such as storage devices, storage and switch ports, database instances, host devices and file systems, and the like. Management of such environments is a daunting task and typically requires Storage Resource Management solutions such as EMC's Control Center (ECC) family of products, available from EMC Corporation of Hopkinton, Mass. ECC includes agents that are deployed on storage elements for the purpose of gathering data about these elements, components that process and persist data, applications that use persisted information to enable the management of these environments. ECC identifies the entire process of retrieving the collected data from agents to data persistence as a transaction.

SUMMARY

One of the most important features of any storage area network management product is providing a user with an alert when an event occurs, such as a failure of a network device or a change in the state of a network device. Alerts serve as the first line of notification of a problem or other event to a network administrator. Without alerts, minor events may become critical events, or worse, critical events may go unnoticed until a large-scale system failure occurs.

Conventional technologies for generating an alert typically use a message distribution system, such as e-mail or paging, to deliver an alert to a network administrator. Additionally, storage area network management products typically provide a visual indication of the alert in the graphical user interface of the management product, the graphical user interface being shown on a display device such as a computer monitor. For example, network devices are typically associated with small icons that are displayed in a hierarchical tree on the graphical user interface; the icons identify particular network devices. If a network device such as a host suffers a failure event, the icon that is associated with that particular host may be changed on the graphical user interface to reflect the failure of the host. Another part of the graphical user interface may include an alert message area, in which a short text message is displayed whenever an event such as a failure of a network device occurs. Though these types of visual notifications are generally effective in notifying a user of the existence of an alert when the user is immediately in front of, or otherwise close to, the graphical user interface, they do not work well in notifying the user in cases where the user is working at a distance away from the graphical user interface and cannot easily see a change in a small icon or a display of a short text message in a small font.

Embodiments disclosed below significantly overcome such problems by using a watermark image on the graphical user interface of a storage area network management product to provide an alert. The watermark is sized appropriately so that it is easy for a user of the storage area network management product, such as EMC's Control Center, to see at a distance away from the graphical user interface. Additionally, the color, pattern, display style, and/or placement of the watermark on the graphical user interface are such that a user located at a distance away from the graphical user interface may not only easily see the watermark, and is thus able to know that an alert has been generated, but is also able to know the severity of the alert and possibly the network device or devices that the alert pertains to. With such a method of notification in place, the user is free to move around without fear of delay in notification of any alert.

More specifically, when a storage area network management product detects an event that corresponds to one or more network devices within the storage area network and would result in an alert, the storage area network management product determines an alert level that corresponds to the type of event detected. For example, the network management product may detect that a disk storage system in the storage area network has reached a certain storage threshold. The network management product then determines that the disk storage system reaching that storage threshold should result in a critical alert. The network management product generates the alert by placing a watermark image on the graphical user interface of the network management product. How the watermark image looks on the graphical user interface may depend on the type of event and/or on the level of the alert. For example, a reddish tint to a watermark may indicate a critical alert, such as the failure of a component. Alternatively, a critical alert may be indicated by animation of the watermark to show different color tones of the color red. Further, to indicate that the critical alert is in reference to a disk storage system, the watermark may be in the shape of an icon typically used to denote a disk storage system. Additionally, or alternatively, the watermark may be placed in a region of the graphical user interface of the network management product that is associated with disk storage systems.

In this manner, multiple alerts may be provided to a user of a storage area network management product through a sequence of watermarks or changes made to an initial watermark. For example, if the storage area network management product detects seven distinct events, and each detected event should result in an alert, an animation of seven different watermarks may be provided on the graphical user interface of the storage area network management product. Alternatively, an initial watermark on the graphical user interface of the storage area network management product may undergo seven changes in a characteristic of the watermark to identify the seven total alerts. For example, the appearance of the watermark on the graphical user interface of the storage area network management product may change in color from blue to red to yellow to green to red to green to yellow to red, and then continually cycle through that pattern. In yet another possible alternative, an initial watermark located on the bottom left portion of the graphical user interface of the storage area network management product may be moved around the graphical user interface in a certain pattern, or to different regions of the graphical user interface, to indicate the various alerts. When multiple alerts are indicated in one of these or other similar ways, as a user of the storage area network management product addresses the events that caused the storage area network management product to generate the alerts, the alert corresponding to the resolved event would no longer be generated. The examples given above are illustrative and not limiting, in that the watermark alert application may be configured according to a user's desires, such that any combination of color, style, placement, and animated changes may be used to indicated alerts.

Thus, a user of the storage area network management product may be able to configure both alert levels for events and the corresponding watermark(s) associated with both an alert level and a type of event. For example, a user may be able to associate different thresholds of the amount of storage space available in a disk storage system with a different alert level. Thus, the user may configure the management product so that, when a disk storage system is 20% full, a minor alert is generated, resulting in a flashing green watermark placed on the upper right of the graphical user interface of the management product, and when a disk storage system is 95% full, a critical alert is generating, resulting in a flashing red watermark placed in the middle of the graphical user interface. Any number of combinations of alert levels, events, and watermarks are possible.

More particularly, in an embodiment there is provided a method of using a watermark as an alert on a graphical user interface. The alert provides notification of the occurrence of an event in a storage area network. The method includes detecting an event associated with a component of the storage area network; determining an alert level corresponding to the detected event; and placing a watermark on the graphical user interface to indicate an alert, wherein an initial characteristic of the watermark depends on the determined alert level, and wherein the watermark is oriented to be visible at a distance from the graphical user interface.

In a related embodiment, the method may include detecting a second event associated with a component of the storage area network; determining a second alert level corresponding to the detected second event; and changing the initial characteristic of the placed watermark to a new characteristic, wherein the new characteristic corresponds to the determined second alert level. In a further related embodiment, detecting a second event may include detecting multiple events, each event associated with a component of the storage area network; and determining a second alert level may include determining an alert level for each detected event, wherein the determined alert level corresponds to the detected event; and changing may include changing the placed watermark by cycling through a number of characteristics beginning with the initial characteristic of the watermark, the number of characteristics corresponding to the number of detected events, wherein each change in the watermark corresponds to a determined alert for a detected event. In yet a further related embodiment, the method may include removing a characteristic from the number of characteristics when the event corresponding to that characteristic is no longer detected.

In another related embodiment, an initial watermark is present on the graphical user interface upon initiation of the graphical user interface. The initial watermark is oriented to be visible at a distance from the graphical user interface, and placing may include changing the initial watermark to a new watermark, wherein the new watermark depends on the determined alert level. In yet another related embodiment, placing may include placing a watermark on the graphical user interface to indicate an alert, wherein a characteristic of the watermark changes over time, wherein the change depends on the determined alert level, and wherein the watermark is oriented to be visible at a distance from the graphical user interface.

In still another related embodiment, placing may include placing a watermark on the graphical user interface to indicate an alert, wherein an initial characteristic of the watermark depends on the determined alert level, and wherein the watermark is placed in a region of the graphical user interface that corresponds to the component of the storage area network for which the event was detected, the watermark oriented to be visible at a distance from the graphical user interface.

In another embodiment, there is provided a computer system including a memory, a processor, a display, and an interconnection mechanism coupling the memory, the processor and the display allowing communication there between. The memory of the computer system is encoded with an alert application, that when executed in the processor, provides an alert process that uses watermarks to indicate alerts for components of a storage area network, by causing the computer system to perform the operations of: detecting an event associated with a component of the storage area network; determining an alert level corresponding to the detected event; and placing a watermark on the graphical user interface to indicate an alert, wherein an initial characteristic of the watermark depends on the determined alert level, and wherein the watermark is oriented to be visible at a distance from the graphical user interface.

In yet another embodiment, there is provided a computer program product, stored on computer readable medium, to user watermarks to indicate alerts related to components of a storage area network. The computer program product includes computer program code for detecting an event associated with a component of the storage area network; computer program code for determining an alert level corresponding to the detected event; and computer program code for placing a watermark on the graphical user interface to indicate an alert, wherein an initial characteristic of the watermark depends on the determined alert level, and wherein the watermark is oriented to be visible at a distance from the graphical user interface.

It is to be understood that the system of the present application can be embodied solely as a software program, or as a software program operating in conjunction with corresponding hardware. For example, embodiments of the present application may be implemented in EMC's ECC Console software application that provides graphical configuration management functionality of storage area network resources. Embodiments of the present application may also be implemented in computer devices that operate the ECC Console software. ECC Console software is manufactured by EMC Corporation of Hopkinton, Mass., USA.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Generally, disclosed embodiments include methods and systems for placing a watermark on a graphical user interface, the graphical user interface a management product for a storage area network. The watermark serves as an alert to inform a user of the management product that an event has occurred to a component of the storage area network. The watermark is sized appropriately so that it is easy for a user of the storage area network management product to see the watermark at a distance away from the graphical user interface. Characteristics of the watermark, such as color, pattern, display style, and/or placement of the watermark on the graphical user interface are such that a user located at a distance away from the graphical user interface may not only easily see the watermark, and is thus able to know that an alert has been generated, but is also able to know the severity of the alert and possibly the network device or devices that the alert pertains to. With such a method of notification in place, the user is free to move around without fear of delay in notification of any alert. Multiple alerts may be provided by changing between watermarks on the graphical user interface, or by changing one or more characteristics of a watermark on the graphical user interface. Multiple alerts may also be provided by changing the placement of the watermark within the graphical user interface. When multiple alerts are indicated, as a user of the storage area network management product addresses the events that caused the storage area network management product to generate the alerts, the alert corresponding to the resolved event would no longer be generated.

A user of the storage area network management product may be able to configure both alert levels for events and the corresponding watermark(s) associated with both an alert level and a type of event. For example, a user may be able to associate different thresholds of the amount of storage space available in a disk storage system with a different alert level. Any number of combinations of alert levels, events, and watermarks are possible.

Figure 1:
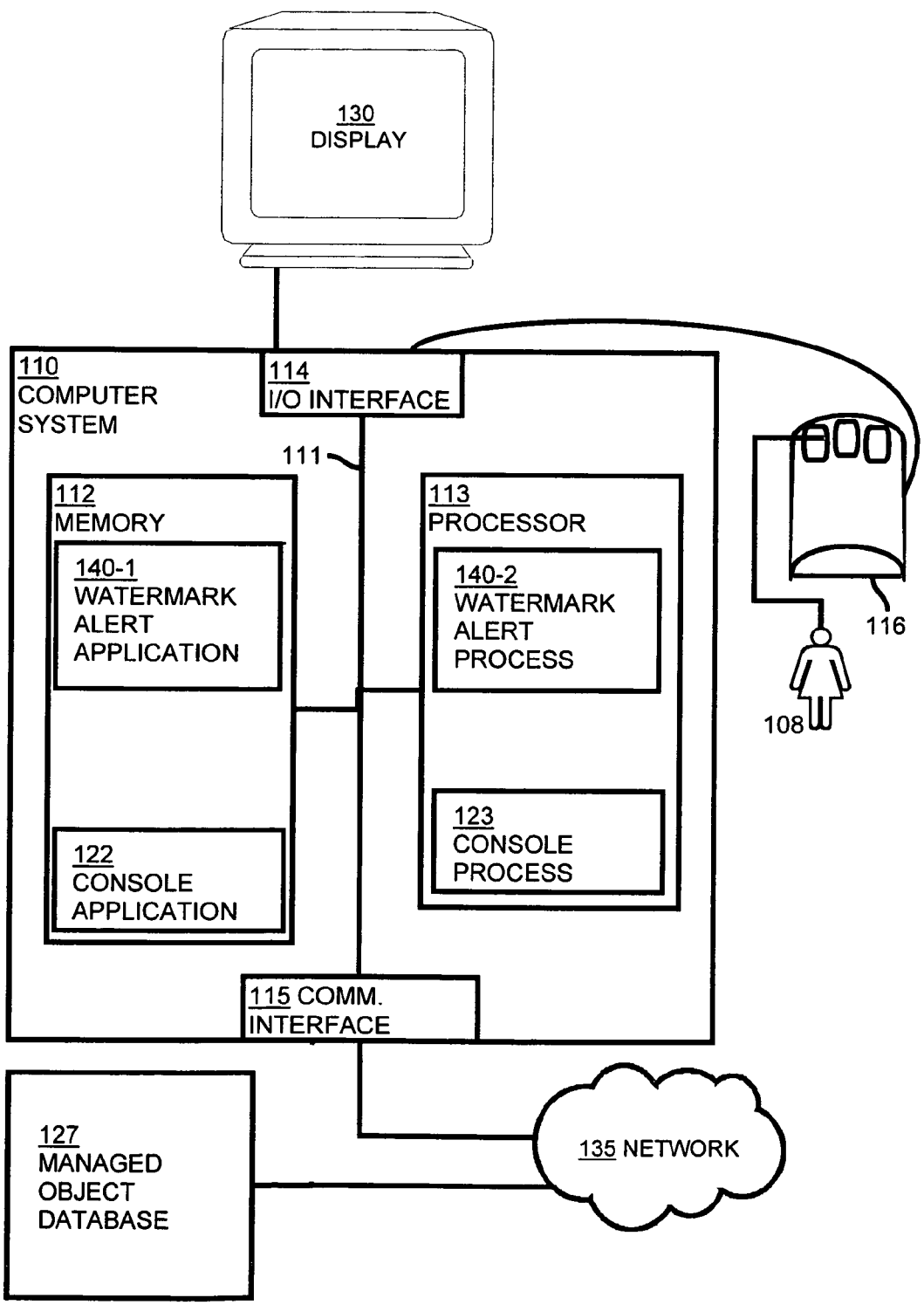
FIG. 1 shows a high-level block diagram of a computer system according to one embodiment disclosed herein.

Embodiments disclosed herein provide for using watermark as alerts, as described below. More particularly, FIG. 1 is a block diagram illustrating example architecture of a computer system 110 that executes, runs, interprets, operates or otherwise performs a watermark alert application 140-1 and a watermark alert process 140-2, suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, touchpad, trackball, etc.) couples to the processor 113 through the I/O interface 114 and enables a user 108 such as a system administrator of a storage area network to provide input commands and generally administer the storage area network through the graphical user interface (shown in FIG. 2A) that is provided on a display 130. The communications interface 115 enables the computer system 110 to communicate with other devices on a network 135, such as but not limited to components of the storage area network (not shown) and a managed object database 127.

The memory system 112 is any type of computer readable medium and in this example is encoded with a watermark alert application 140-1 that includes watermark alert process 140-2. The watermark alert application 140-1 may be embodied as software code such as data and/or logic instructions (e.g., code stored in the memory system 112 or on another computer readable medium such as a removable disk) that supports processing functionality according to different embodiments described herein. A console application 122 may also be embodied as software code in the memory system 112. During operation of the computer system 110, the processor 113 accesses the memory system 112 via the interconnection mechanism 111 in order to launch, run, execute, interpret or otherwise perform the logic instructions of the watermark alert application 140-1 and the console application 122. Execution of the watermark alert application 140-1 in this manner produces processing functionality in a watermark alert process 140-2. Similarly, execution of the console application 122 produces processing functionality in a console process 123. In other words, the watermark alert process 140-2 represents one or more portions or runtime instances of the watermark alert application 140-1 performing or executing within or upon the processor 113 in the computer system 110 at runtime.

It is noted that example configurations disclosed herein include the watermark alert application 140-1 itself including the watermark alert process 140-2 (i.e., in the form of unexecuted or non-performing logic instructions and/or data). The watermark alert application 140-1 may be stored on a computer readable medium (such as a floppy disk), hard disk, electronic, magnetic, optical or other computer readable medium. The watermark alert application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the watermark alert application 140-1 in the processor 113 as the watermark alert process 140-2. Those skilled in the art will understand that the computer system 110 may include other processes and/or software and hardware components, such as an operating system not shown in this example.

Figure 2A:
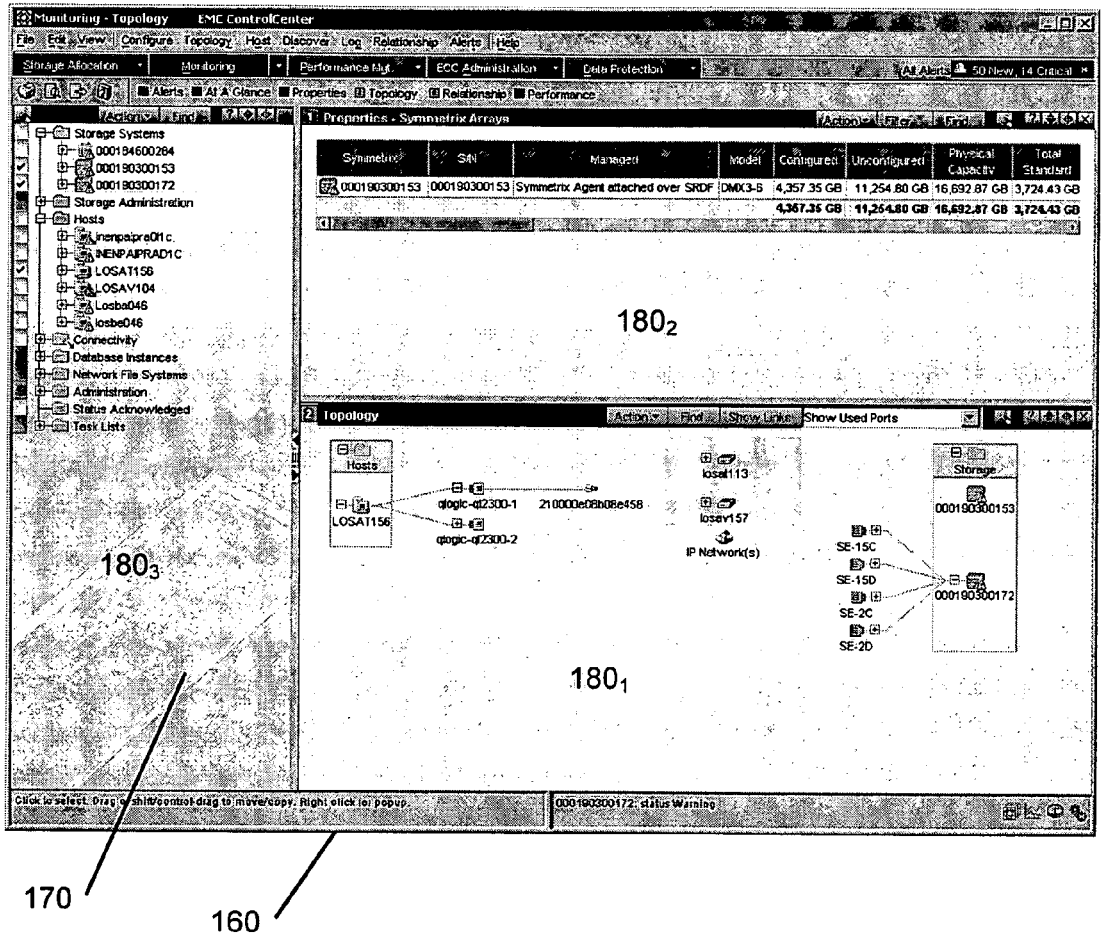
FIG. 2A is a screenshot of an alert watermark placed on a graphical user interface by a watermark alert application that executes on the computer system of FIG. 1.
Figure 2B:
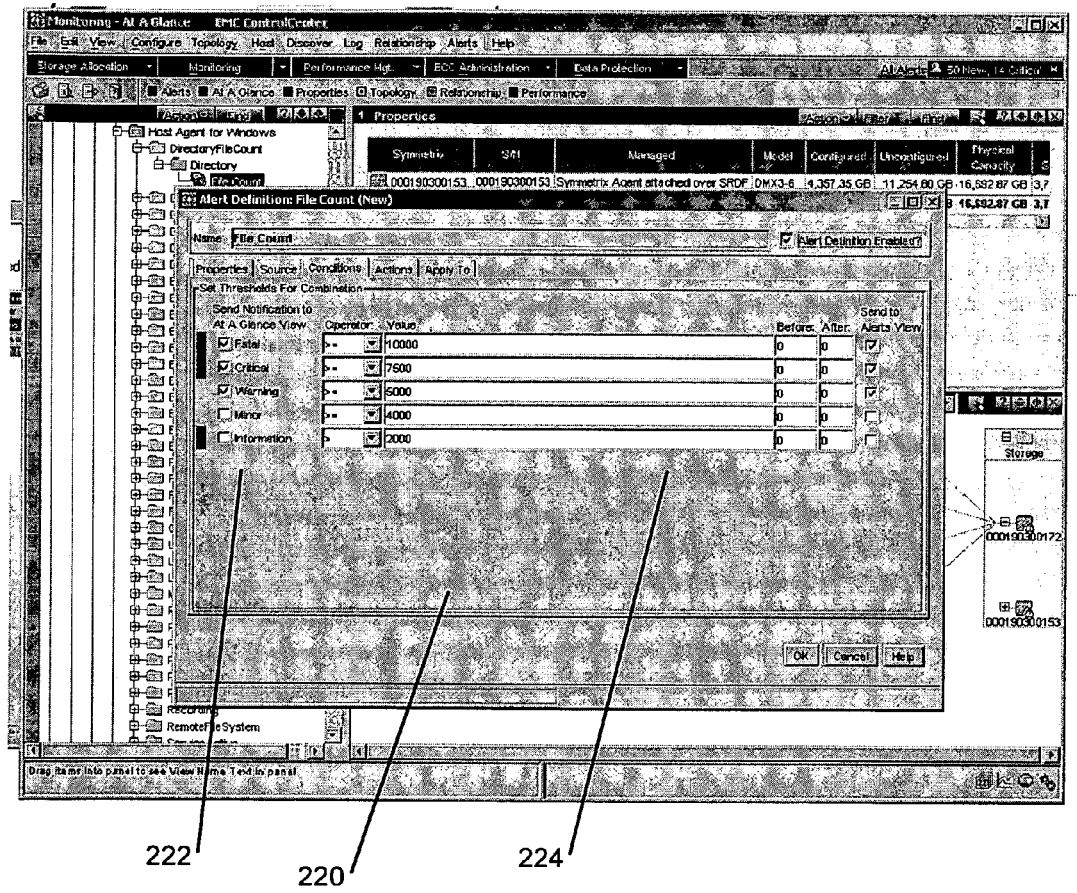
FIG. 2B is a screenshot of a configuration program for assigning alert levels within a graphical user interface.
Figure 3:
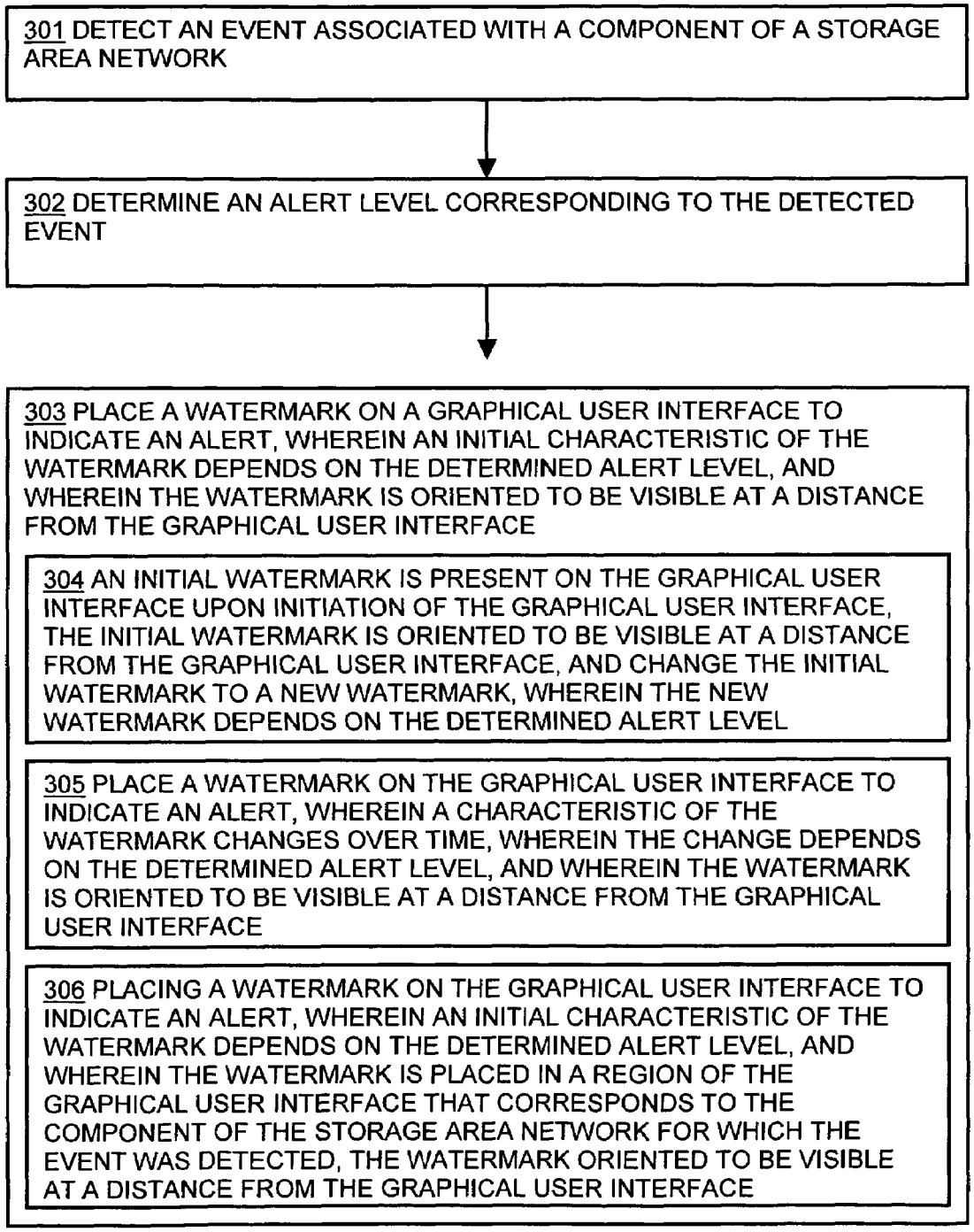
FIG. 3 illustrates a flowchart of a procedure performed by the system of FIG. 1 when placing an alert watermark on a graphical user interface, the graphical user interface used to manage components of a storage area network.
Figure 4:
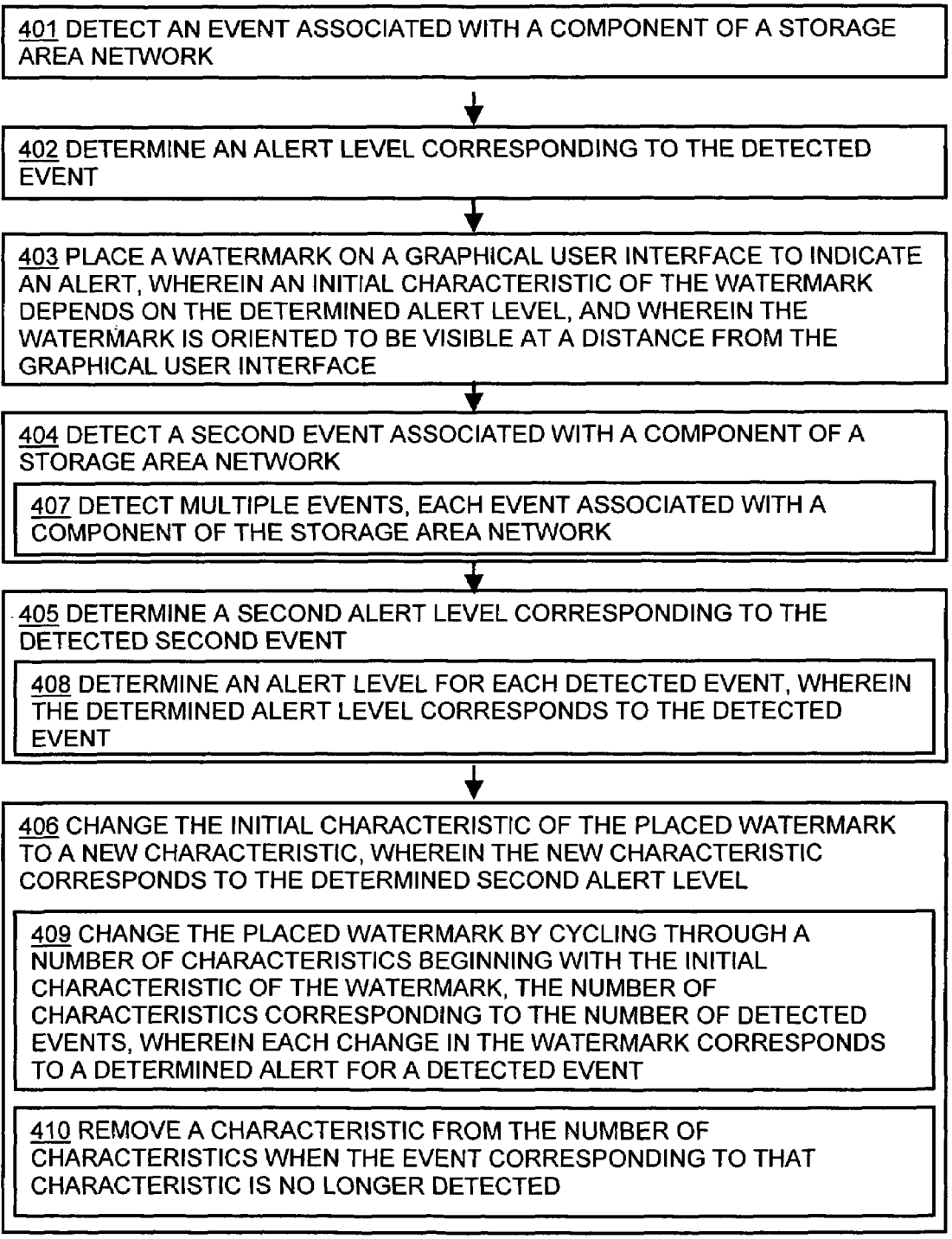
FIG. 4 illustrates a flowchart of a procedure performed by the system of FIG. 1 when detecting multiple events and placing multiple alert watermarks on the graphical user interface.

FIG. 2A is a screenshot of the watermark alert application 140-1 executing as the watermark alert process 140-2, as shown on the display 130 (shown in FIG. 1). FIG. 2B is a screenshot of a configuration graphical user interface that is part of the watermark alert application 140-1. FIG. 3 illustrates a flowchart of an embodiment of the watermark alert application 140-1 as performed by the system of FIG. 1 when placing a watermark alert on a graphical user interface. FIG. 4 illustrates a flowchart of an embodiment of the watermark alert application 140-1 as performed by the system of FIG. 1 when indicating multiple alerts on the graphical user interface.

In FIG. 2A, a user 108 (shown in FIG. 1), such as a storage area network administrator, using an input device 116 (shown in FIG. 1) on a graphical user interface 160 is able to manage a storage area network and its various components. When an event occurs to a component of the storage area network, the watermark alert process 140-2 provides the user 108 with an alert. The watermark alert process 140-2 places a watermark 170 on the graphical user interface to serve as the alert, is as described in greater detail below. Upon seeing the watermark 170, which is visible at a distance from the graphical user interface 160, the user 108 is aware that an event has occurred and may take appropriate steps to address it.

FIG. 3 illustrates a flowchart of a procedure performed by the system of FIG. 1 when placing a alert watermark on a graphical user interface, the graphical user interface used to manage components of a storage area network. The watermark alert process 140-2 detects an event associated with a component of the storage area network, step 301. The event may be anything that could happen on the storage area network. For example, the failure of a component is an event, as is a disk storage system reaching a certain storage threshold, as is a number of communications between two components of the storage area network that is greater than a typical number, as is a component powering on or powering off. The event need not be a problem in order to be detected by the watermark alert process 140-2.

After the watermark alert process 140-2 detects an event, the watermark alert process 140-2 determines an alert level that corresponds to the detected event, step 302. For example, if the watermark alert process 140-2 detects that a disk storage system has reached 60% of capacity, the watermark alert process 140-2 may determine that that event corresponds to a mid-level yellow alert. Alert levels may vary for each component or type of component of a storage area network. Alert levels may also vary according to the usage and/or design of the storage area network. For example, a storage area network that includes many disk storage systems, none of which are filled past ten percent of capacity will have a different alert levels than a storage area network that includes many disk storage systems, all of which are filled to near capacity. A user 108 of the watermark alert process 140-2 may define the alert levels for each component and/or event, and thus what event corresponds to what alert level. A graphical user interface 220 shown in FIG. 2B is one possible way for the user 108 to define an alert level 222, wherein the choices for an alert level 222 are fatal, critical, warning, minor, and information, though these are merely examples of possible alert levels and are not limiting. Criteria 224 for the each alert level 222 may also be defined by the user 108. Any number of alert levels and any criteria for an alert level are possible.

After determining an alert level that corresponds to the detected event, the watermark alert process 140-2 places a watermark 170 (see in FIG. 2A) on the graphical user interface 160 to indicate an alert, step 303. The watermark 170 has at least one initial characteristic, such as color, color scheme, shape, pattern, style, and the like. The initial characteristic of the watermark 170 depends on the alert level determined for the detected event by the watermark alert process 140-2. Thus, if the detected event is the failure of a host, and the alert level corresponding to that event is critical, the watermark 170 may initially be red. The watermark alert process 140-2, when placing the watermark 170 on the graphical user interface 160, also orients the watermark 170 to be visible at a distance from the graphical user interface 160. This allows a user 108 of the storage area network management product to move away from the display 130 that shows the graphical user interface 160 yet still be alerted.

Instead of placing a watermark on the graphical user interface after detecting an event and determining an alert level associated with the event, the watermark alert process 140-2 may place an initial watermark on the graphical user interface upon initiation of the graphical user interface. The watermark alert process 140-2 orients the initial watermark so that it is visible at a distance from the graphical user interface. When an event is detected, and an alert level corresponding to that event is determined, the watermark alert process 140-2 may change the initial watermark to a new watermark, wherein the new watermark depends on the determined alert level, step 304. The initial watermark and the new watermark may differ in any distinguishing characteristic. The watermark alert process 140-2 may animate the change from the initial watermark to the new watermark so that it continually repeats for as long as the event is detected.

Similarly, the watermark alert process 140-2 may place a watermark on the graphical user interface to indicate an alert, and then change a characteristic of the watermark over time, step 304. The change in the characteristic of the watermark by the watermark alert process 140-2 depends on the determined alert level. For example, if the detected event is a disk storage system reaching ninety-five percent of storage capacity, and the alert level corresponding to this event is critical, the watermark alert process 140-2 may place a blue watermark on the graphical user interface, and over time, change the hue of the blue watermark from a light blue to a dark blue to indicate that the alert is critical. Regardless of the change in the characteristic of the watermark, when the watermark alert process 140-2 places the watermark on the graphical user interface, the watermark alert process 140-2 orients the watermark so that it is visible at a distance from the graphical user interface.

Further, the watermark alert process 140-2 may place a watermark in a particular region of the graphical user interface to indicate an alert, step 306. The region may correspond to the component of the storage are network for which the event was detected, and an initial characteristic of the watermark may depend on the determined alert level. For example, the graphical user interface 160 may be divided into a number of regions or panels 180$_N$ (shown in FIG. 2A). The region 180$_1$ at the bottom right of the graphical user interface 160 may be used to control disk storage systems of the storage area network. Thus, any watermarks that appear in that particular region of the graphical user interface 160 related to an alert or alerts for one or more disk storage systems. An initial characteristic of the watermark depends on the determined alert level, so that if the alert level is minor, the watermark may be a shade of green. Regardless of the region of the graphical user interface in which the watermark alert process 140-2 places the watermark, when the watermark alert process 140-2 places the watermark on the graphical user interface, the watermark alert process 140-2 orients the water so that it is visible at a distance from the graphical user interface.

FIG. 4 illustrates a flowchart of a procedure performed by the system of FIG. 1 when detecting multiple events and placing multiple alert watermarks on the graphical user interface.

For a first alert, the watermark alert process 140-2 detects an event associated with a component of the storage area network, step 401, determines an alert level corresponding to the detected event, step 402, and places a watermark on the graphical user interface to indicate an alert, wherein an initial characteristic of the watermark depends on the determined alert level, and wherein the watermark is oriented to be visible at a distance from the graphical user interface, step 403, all as described above.

While performing steps 401-403, the watermark alert process 140-2 may detect a second event associated with a component of the storage area network, step 404. Alternatively, the watermark alert process 140-2 may detect multiple events, each event associated with a component of the storage area network, step 407. In either situation, two or more detected events may be associated with the same component of the storage area network, or each detect event may be associated with a different component of the storage area network. The watermark alert process 140-2 will detect and keep track of each event.

The watermark alert process 140-2 then determines a second alert level corresponding to the detected second event, step 405, or in the case of multiple detected events, determines an alert level for each detected event, wherein the determined alert level corresponds to the detected event, step 408.

After determining the second alert level, the watermark alert process 140-2 changes the initial characteristic of the placed watermark to a new characteristic, wherein the new characteristic corresponds to the determined second alert level, step 406. For example, if the first event was a disk storage system reaching fifty percent of storage capacity, and had an associated alert level of minor, the watermark alert process 140-2 might place an orange watermark on the graphical user interface; thus, in this example, an orange watermark indicates a minor alert. If the second event was a host turning off because of a loss of power, and had an associated alert level of critical, the watermark alert process 140-2 might change the color of the placed watermark from orange to black; thus, in this example, black indicates a critical alert. The watermark alert process 140-2 may continually cycle between the two characteristics to indicate two alerts are present on the graphical user interface. Thus, in the example given herein, the watermark alert process 140-2 may continually change the color of the watermark from orange to black to orange to black and so on, so that a user knows about both alerts.

If the watermark alert process 140-2 has detected multiple events, the watermark alert process 140-2 may instead change the placed watermark by cycling through a number of characteristics beginning with the initial characteristic of the watermark, step 409. The number of characteristics cycled through by the watermark alert process 140-2 corresponds to the number of detected events, and each change in the placed watermark corresponds to a determined alert for a detected event. To continue the example discussed above, a third detected event may have an associated alert level of warning, which would result in a purple watermark on the graphical user interface. Thus, the watermark alert process 140-2 cycles through three colors of the watermark—orange, black, and purple—each color corresponding to one of the three detected events, and each change in color indicating a different alert.

When a user 108 of the storage area network management product acts to address the underlying event after having seen a watermark alert, the watermark alert process 140-2 may no longer provide the alert associated with that underlying event. For example, in the multiple alert example given above, if the user 108 acknowledges the event underlying the orange alert, i.e., that the disk storage system has reached fifty percent of capacity, the watermark alert process 140-2 no longer needs to provide the alert. Thus, the watermark alert process 140-2 may remove a characteristic from the number of characteristics when the event corresponding to that characteristic is no longer detected, step 410. In this example, the watermark alert process 140-2 would no longer change the watermark to an orange color, but would continue to change the watermark from black to purple to black to purple and so on, to indicate that the alerts indicated by those colors were still ongoing. To address the underlying event of an alert, the user 108 of the storage management product may simply need to acknowledge the event, as described above, or may need to take other actions, such as repairing a failed host or adding storage capacity to an almost-full disk storage system, in order for the watermark alert process 140-2 to no longer provide the alert.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method in which at least one computer system accesses instructions from computer storage and executes the instructions to use a watermark as an alert on a graphical user interface, wherein the alert provides notification of the occurrence of an event in a storage area network, the method comprising:

detecting an event associated with a component of the storage area network, wherein the event is detected by the at least one computer system;

determining an alert level corresponding to the detected event; and placing a watermark on the graphical user interface to indicate an alert, wherein an initial characteristic of the watermark depends on the determined alert level, and wherein the watermark is oriented to be visible at a distance from the graphical user interface;

displaying multiple regions in the graphical user interface, a first region providing at least one functionality for controlling at least one storage area network component; and wherein placing the watermark on the graphical user interface includes: placing a first portion of the watermark within the first region and placing a second portion of the watermark within a second region of the graphical user interface;

displaying at least one graphical object in a graphical user interface region, the graphical object representing a storage area network component; and wherein placing the watermark on the graphical user interface includes: blocking display of a watermark portion located at a display position of the graphical object.

2. The method of claim 1 comprising:
detecting a second event associated with a component of the storage area network;
determining a second alert level corresponding to the detected second event; and
changing the initial characteristic of the placed watermark to a new characteristic, wherein the new characteristic corresponds to the determined second alert level.

3. The method of claim 2 wherein detecting a second event comprises:
detecting multiple events, each event associated with a component of the storage area network;
and wherein determining a second alert level comprises:
determining an alert level for each detected event, wherein the determined alert level corresponds to the detected event;
and wherein changing comprises:
changing the placed watermark by cycling through a number of characteristics beginning with the initial characteristic of the watermark, the number of characteristics corresponding to the number of detected events, wherein each change in the watermark corresponds to a determined alert for a detected event.

4. The method of claim 3 comprising:
removing a characteristic from the number of characteristics when the event corresponding to that characteristic is no longer detected.

5. The method of claim 1 wherein an initial watermark is present on the graphical user interface upon initiation of the graphical user interface, the initial watermark is oriented to be visible at a distance from the graphical user interface, and wherein placing comprises:
changing the initial watermark to a new watermark, wherein the new watermark depends on the determined alert level.

6. The method of claim 1 wherein placing comprises:
placing a watermark on the graphical user interface to indicate an alert, wherein a characteristic of the watermark changes over time, wherein the change depends on the determined alert level, and wherein the watermark is oriented to be visible at a distance from the graphical user interface.

7. The method of claim 1 wherein placing comprises:
placing a watermark on the graphical user interface to indicate an alert, wherein an initial characteristic of the watermark depends on the determined alert level, and wherein the watermark is placed in a region of the graphical user interface that corresponds to the component of the storage area network for which the event was detected, the watermark oriented to be visible at a distance from the graphical user interface.

8. The method as in claim 1, wherein a portion of the watermark relates to at least one storage area network component.

9. The method as in claim 1, wherein the watermark comprises a transparent view of at least one hierarchy of storage area network components.

10. The method as in claim 1, wherein a portion of the watermark comprises a rendering of at least one region currently displayed by the graphical user interface.

11. The method as in claim 1, comprises:
wherein detecting the event includes: identifying at least one event characteristic; and
wherein determining the alert level includes: matching the event to a user-defined alert level configured by a user to describe an occurrence of the identified event characteristic, the user-defined alert level selected from a plurality of user-defines alert levels.

12. A computer system comprising:
a memory;
a processor;
a display; and
an interconnection mechanism coupling the memory, the processor and the display allowing communication there between, wherein the memory of the computer system is encoded with an alert application, that when executed in the processor, provides an alert process that uses watermarks to indicate alerts for components of a storage area network detecting an event associated with a component of the storage area network, causing the computer system to perform the operations of:
determining an alert level corresponding to the detected event; and
placing a watermark on the graphical user interface to indicate an alert, wherein an initial characteristic of the watermark depends on the determined alert level, and wherein the watermark is oriented to be visible at a distance from the graphical user interface;
displaying multiple regions in the graphical user interface, a first region providing at least one functionality for controlling at least one storage area network component; and
wherein placing the watermark on the graphical user interface includes: placing a first portion of the watermark within the first region and placing a second portion of the watermark within a second region of the graphical user interface;
displaying at least one graphical object in a graphical user interface region, the graphical object representing a storage area network component; and
wherein placing the watermark on the graphical user interface includes: blocking display of a watermark portion located at a display position of the graphical object.

13. The computer system of claim 12 comprising:
detecting a second event associated with a component of the storage area network;
determining a second alert level corresponding to the detected second event; and changing the initial characteristic of the placed watermark to a new characteristic, wherein the new characteristic corresponds to the determined second alert level.

14. The computer system of claim 13 wherein detecting comprises:
detecting multiple events, each event associated with a component of the storage area network;
and wherein determining comprises:
determining an alert level for each detected event, wherein the determined alert level corresponds to the detected event;
and wherein changing comprises:
changing the placed watermark by cycling through a number of characteristics beginning with the initial characteristic of the watermark, the number of characteristics corresponding to the number of detected events, wherein each change in the watermark corresponds to a determined alert for a detected event.

15. The computer system of claim 14 comprising:
  removing a characteristic from the number of characteristics when the event corresponding to that characteristic is no longer detected.

16. The computer system of claim 12 wherein an initial watermark is present on the graphical user interface upon initiation of the graphical user interface, the initial watermark is oriented to be visible at a distance from the graphical user interface, and wherein placing comprises:
  changing the initial watermark to a new watermark, wherein the new watermark depends on the determined alert level.

17. The computer system of claim 12 wherein placing comprises:
  placing a watermark on the graphical user interface to indicate an alert, wherein a characteristic of the watermark changes over time, wherein the change depends on the determined alert level, and wherein the watermark is oriented to be visible at a distance from the graphical user interface.

18. A computer program product, stored on computer readable medium, to use watermarks to indicate alerts related to components of a storage area network, the computer program product comprising:
  computer program code for detecting an event associated with a component of the storage area network;
  computer program code for determining an alert level corresponding to the detected event; and
  computer program code for placing a watermark on the graphical user interface to indicate an alert, wherein an initial characteristic of the watermark depends on the determined alert level, and wherein the watermark is oriented to be visible at a distance from the graphical user interface;
  computer program code for displaying multiple regions in the graphical user interface, a first region providing at least one functionality for controlling at least one storage area network component; and
    wherein placing the watermark on the graphical user interface includes: placing a first portion of the watermark within the first region and placing a second portion of the watermark within a second region of the graphical user interface;
  computer program code for displaying at least one graphical object in a graphical user interface region, the graphical object representing a storage area network component and
    wherein placing the watermark on the graphical user interface includes: blocking display of a watermark portion located at a display position of the graphical object.

19. The computer program product of claim 18 comprising:
  computer program code for detecting a second event associated with a component of the storage area network;
  computer program code for determining a second alert level corresponding to the detected second event; and
  computer program code for changing the initial characteristic of the placed watermark to a new characteristic, wherein the new characteristic corresponds to the determined second alert level.

20. The computer program product of claim 19 wherein computer program code for detecting comprises:
  computer program code for detecting multiple events, each event associated with a component of the storage area network;
  and wherein computer program code for determining comprises:
  computer program code for determining an alert level for each detected event, wherein the determined alert level corresponds to the detected event;
  and wherein computer program code for changing comprises:
  computer program code for changing the placed watermark by cycling through a number of characteristics beginning with the initial characteristic of the watermark, the number of characteristics corresponding to the number of detected events, wherein each change in the watermark corresponds to a determined alert for a detected event.

21. The computer program product of claim 20 comprising:
  computer program code for removing a characteristic from the number of characteristics when the event corresponding to that characteristic is no longer detected.

22. The computer program product of claim 18 wherein an initial watermark is present on the graphical user interface upon initiation of the graphical user interface, the initial watermark is oriented to be visible at a distance from the graphical user interface, and wherein computer program code for placing comprises:
  computer program code for changing the initial watermark to a new watermark, wherein the new watermark depends on the determined alert level.

23. The computer program product of claim 18 wherein computer program code for placing comprises:
  computer program code for placing a watermark on the graphical user interface to indicate an alert, wherein a characteristic of the watermark changes over time, wherein the change depends on the determined alert level, and wherein the watermark is oriented to be visible at a distance from the graphical user interface.

24. The computer program product of claim 18 wherein computer program code for placing comprises:
  computer program code for placing a watermark on the graphical user interface to indicate an alert, wherein an initial characteristic of the watermark depends on the determined alert level, and wherein the watermark is placed in a region of the graphical user interface that corresponds to the component of the storage area network for which the event was detected, the watermark oriented to be visible at a distance from the graphical user interface.

* * * * *